United States Patent [19]

Bria et al.

[11] Patent Number: 5,882,747
[45] Date of Patent: Mar. 16, 1999

[54] LIGHTER THAN AIR BALLOONS

[75] Inventors: Frank Harry Bria, Pittsford; Victor Alfred Platta, Mendon; Ronald Clark Wood, Jr., Pittsford, all of N.Y.

[73] Assignee: Terphane Inc., Bloomfield, N.Y.

[21] Appl. No.: 667,892

[22] Filed: Jun. 21, 1996

Related U.S. Application Data

[63] Continuation of Ser. No. 320,623, Oct. 7, 1994, abandoned.

[51] Int. Cl.$^6$ ........................................ A63H 3/06
[52] U.S. Cl. .................. 428/35.2; 428/35.3; 428/35.4; 428/35.8; 428/35.9; 428/336; 428/337; 446/220
[58] Field of Search .................. 428/35.2, 35.3, 428/35.4, 35.6, 35.7, 35.8, 35.9, 36.6, 36.7, 337, 336, 332; 446/220, 222

[56] References Cited

U.S. PATENT DOCUMENTS

| | | | |
|---|---|---|---|
| Re. 34,537 | 2/1994 | Deyrup | 428/35.7 |
| 4,077,588 | 3/1978 | Hurst | 24/31 |
| 4,290,763 | 9/1981 | Hurst | 493/341 |
| 4,556,590 | 12/1985 | Martin | 428/35 |
| 4,634,395 | 1/1987 | Burchett | 446/222 |
| 4,656,094 | 4/1987 | Kojima et al. | 428/412 |
| 4,684,553 | 8/1987 | Sasaki | 428/35 |
| 4,693,695 | 9/1987 | Cheng | 446/220 |
| 4,928,474 | 5/1990 | Schirmer | 53/425 |
| 5,023,118 | 6/1991 | Cheng | 428/24 |
| 5,023,120 | 6/1991 | Akao | 428/35.9 |
| 5,075,143 | 12/1991 | Bekele | 428/36.6 |
| 5,089,353 | 2/1992 | Negi | 428/518 |
| 5,100,720 | 3/1992 | Sawada | 428/215 |
| 5,279,873 | 1/1994 | Oike | 428/35.4 |
| 5,346,763 | 9/1994 | Balloni | 428/349 |
| 5,478,320 | 12/1995 | Trotta | 604/96 |

FOREIGN PATENT DOCUMENTS 4115939  4/1992  Japan .

*Primary Examiner*—Rena L. Dye
*Attorney, Agent, or Firm*—Andrew M. Solomon

[57] ABSTRACT

A lighter than air balloon constructed from a flexible film material which has coated one or more of its interior or exterior surfaces thereon a barrier material which is not a pure metal and which has an oxygen transmission rate of less than 0.5 cm$^3$/100 in$^2$/24 hr. at 75° F., 65% relative humidity, said balloon being able to float when inflated with a lighter than air gas and a process for producing the balloon is provided.

16 Claims, No Drawings

LIGHTER THAN AIR BALLOONS

This application is a continuation of application Ser. No. 08/320,623, filed Oct. 07, 1994, now abandoned.

BACKGROUND OF THE INVENTION

1. Field of the Invention

The present invention relates to lighter than air balloons. More specifically, the balloons are constructed from a polymeric film material which has coated thereon a barrier material having an oxygen transmission rate of less than 0.5 $cm^3/100\ in^2/24$ hr. at 75° F., 65% relative humidity. The film material may also be used for other applications such as food and beverage packaging.

2. Technology Description

Conventional lighter than air balloons are typically produced by filling an elastomeric material with a helium containing gas to enable the balloon to "float". Such balloons may be used for novelty purposes and are commonly sold at fairs, circuses, restaurants, gift shops, and the like. While these balloons are still in great use, they are relatively limited in their appearance and by their limited lifetime as a result of helium diffusing through the elastomeric material. Elastomeric balloons have also been used for technical applications, e.g., carrying weather instruments to the upper atmosphere.

Within the past 20 years, a new form of balloon made from polymeric film materials has been produced which has been extremely successful as a premium item. Such balloons are typically constructed of Nylon-6 and have coated thereon a metal layer to reduce the rate of helium diffusion and give the balloon a more attractive appearance. As novelties, these balloons are generally sold for special holidays such as birthdays, graduations, anniversaries, Valentine's Day, and the like at card shops, florists, and other shops. Metallized nylon-6 and metallized polyester films are used for technical applications as well. The key criteria for such balloons is that they be constructed of a material which will float when filled with helium and also be relatively gas impermeable to enable to helium to remain in the interior of the nylon film for extended periods of time.

Examples of such premium novelty balloons are described in the literature. U.S. Pat. Nos. 4,077,588 and 4,290,763 disclose a laminate of a nonelastomeric continuous polymer film having coated thereon a metal film. U.S. Pat. No. 4,693,695 discloses an ascending and descending balloon made from this laminate material.

U.S. Pat. No. 5,023,118 discloses artificial flowers made from non-elastomeric polymer sheets whose inner surfaces are coated with continuous metallic coatings. Laminates having multiple polymer sheets and/or metallic coatings are also suggested for use.

In the case of metallized nylon balloons, both the metal layer and the nylon substrate provide the barrier to helium penetration. Balloons made from metallized polyester have relied heavily on the metal layer for the barrier until now.

A fundamental desire is to provide a material which has a lower weight to area ratio to allow smaller, flotable balloons as well as move innovative shapes. A secondary desire is to reduce the cost of raw materials when producing such premium novelty balloons. More specifically, it would be desirable to produce premium novelty balloons from polymers that are lighter than nylon on a per unit area basis.

Accordingly, there exists a need in the art for balloons which are made from polymeric substrate film materials, are produced from relatively inexpensive raw materials, and can float for extended periods of time.

BRIEF SUMMARY OF THE INVENTION

In accordance with the present invention, balloons which are made from polymeric substrate film materials, are produced from relatively inexpensive raw materials, and can float for extended periods of time are provided.

More specifically, the present invention comprises a balloon which is made from a polymeric film which has coated on at least one of its interior or exterior surfaces a nonmetallic barrier material which effectively functions to prevent permeation of oxygen and other gases into the interior of the balloon, and escape of the helium from within.

In accordance with a preferred embodiment, the present invention comprises a lighter than air balloon constructed from a flexible film material which has coated one or more of its interior or exterior surfaces thereon a barrier material which is not a pure metal and which has an oxygen transmission rate of less than 0.5 $cm^3/100\ in^2/24$ hr. at 75° F., 65% relative humidity, said balloon being able to float when inflated with a lighter than air gas.

In preferred embodiments, the balloon is made from polyethylene terephthalate and the barrier material comprises polyvinyl alcohol. In addition, the balloon preferably has a metal coating on one of its surfaces to give a decorative effect.

Another embodiment of the present invention comprises a lighter than air balloon constructed from a laminar material, said material comprising:

(a) a first layer comprising a polyethylene terephthalate film material;

(b) a second layer comprising polyvinyl alcohol having an oxygen transmission rate of less than 0.5 $cm^3/100\ in^2/24$ hr. at 75° F., 65% relative humidity;

(c) a third layer comprising a moisture impermeable metal layer which is in contact with the surface of said second layer which is not in contact with the surface of said first layer; and (d) a fourth layer comprising an adhesive which is in contact with the surface of said first layer which is not contact with the surface of said second layer;

said balloon being able to float when inflated with a lighter than air gas.

Still another embodiment of the present invention comprises a process for making a lighter than air balloon which is able to float when inflated with a lighter than air gas comprising the steps of:

(a) providing one or more pieces of a flexible film material which has coated one or more of its interior or exterior surfaces thereon a barrier material which is not a pure metal and which has an oxygen transmission rate of less than 0.5 $cm^3/100\ in^2/24$ hr. at 75° F., 65% relative humidity;

(b) cutting and aligning said one or more pieces of said flexible film material to provide a desired shape;

(c) sealing nearly all of said one or more pieces of flexible film material to provide a defined area, with the proviso that an opening be provided to allow for inflation of said defined area;

(d) inflating the interior of said defined area through said opening with a lighter than air gas; and (e) closing said opening.

In a preferred embodiment the process utilizes a valve placed in the opening for inflation of the balloon. In addition, the balloon produced may have a round shape or any other alternative shape.

Accordingly, it is an object of the present invention to provide a novel lighter than air balloon.

Another object of the present invention is to provide a process for making a novel lighter than air balloon.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The balloon of the present invention is derived from a flexible film material which has coated on one or more of its interior or exterior surfaces a barrier material. It is the combination of films and barrier materials that enables the balloon to float when inflated with a lighter than air gas such as helium.

The starting material for the inventive balloon is a flexible film material. The film selected per se is not considered absolutely critical to the invention with the primary consideration being that the film is both flexible and able to float when inflated with a lighter than air gas. Examples of such films include polyethylene terephthalate, polyethylene, polypropylene, polystyrene, polyamide, polyvinyl chloride, cellophane, cellulose acetate, polyurethane, ethylene vinyl acetate copolymer and metal films. Particularly preferred is the use of polyethylene terephthalate.

In practice the thickness of the film ranges from about 3 to about 15 microns.

Coated onto the flexible film substrate is the barrier material. The barrier material is specifically characterized by having an oxygen transmission rate of less than 0.5 $cm^3$/100 $in^2$/24 hr. at 75° F., 65% relative humidity and is not a pure metal. Such materials demonstrate these properties when tested using ASTM test D-3985. In addition, the barrier material has a thickness of between about 200 and about 500 angstroms.

Any of a number of materials may be selected for the barrier material, the prime consideration being the ability to resist air permeation while being light enough to not deter floatability of the balloon. Included amongst them are polyvinyl alcohol, guar gum, polyvinylidene chloride, silicon oxide and aluminum oxide and mixtures thereof. Of the above barrier materials, polyvinyl alcohol is particularly preferred. Polyvinyl alcohol has an oxygen transmission rate of between about 0.04 and about 0.16 $cm^3$/100 $in^2$/24 hr. at 75° F., 65% relative humidity, when applied as described below.

In preferred embodiments, the barrier layer and the flexible film substrate are distinct layers. As such, coating methods which result in separate layers of these materials are considered to be within the scope of this invention. The key criteria to be used when selecting such a method is to maintain a low density of the barrier material to insure floatability.

When using a polyvinyl alcohol as the barrier material, it is preferably applied in solution form, as this enables the formation of as thin of a barrier layer as possible. For example, an aqueous solution of polyvinyl alcohol, containing between about 1 to about 25 percent by weight of polyvinyl alcohol may be applied in solution form onto the flexible film substrate. Particularly preferred is the use of a 10% aqueous solution on a polyethylene terephthalate film. Thereafter, the coated film is stretched and dried simultaneously. In practice the stretching temperature of the film is between the glass transition temperature ($T_g$) and the melting point of the resin. For polyethylene terephthalate, this temperature is between about 375°–400° F.

After the heating and stretching operation, the film is then cooled to cause the polyvinyl alcohol to form a discrete solid film layer onto the flexible film substrate. In practice, by using this operation, it is possible to yield barrier layers of polyvinyl alcohol of between about 200 and about 500 angstroms in thickness.

While the polyvinyl alcohol film is excellent as a gas barrier, it may be susceptible to moisture degradation. Accordingly, it is necessary to coat a moisture impermeable material onto the surface of the barrier layer.

Any material which is capable of resisting moisture while not causing the resulting film material to be too dense for floatability may be selected. Particularly preferred is the use of metals as they can provide additional aesthetic benefits to the final product. Examples of metals which may be applied to the surface of the barrier material include aluminum, copper, gold, silver, iron, chromium, nickel and mixtures thereof. The use of aluminum is particularly preferred because of its price. Alternatively, the use of polymer coatings such as polyurethane, nitrocellulose, polyvinylidene chloride, low density polyethylene, or polyamide is also considered within the scope of this invention.

When using a metal as the moisture impermeable material, it may be applied by techniques known in the art. Such techniques include sputtering, vacuum deposition and the like. In the preferred embodiment, vacuum deposition is selected and is capable of applying a metal layer of about 30 to 500 and more preferably between about 120 and about 250 angstroms. When coating a metal onto the surface of a polyvinyl alcohol layer, the resulting oxygen transmission rate of the balloon can be reduced to between about 0.001 and about 0.01 $cm^3$/100 $in^2$/24 hr. at 75° F., 65% relative humidity.

Alternatively, the moisture impermeable layer which is to be applied to the barrier material may take the form of an adhesive material. The purpose of using an adhesive material is to enable sheets of the final film to be bonded to each other to form a usable product. The primary considerations in selecting a suitable adhesive is that the adhesive be moisture impermeable, be able to adhere to both the substrate and itself, and not be too dense as to deter floatability of the balloon. Specific examples of suitable adhesive materials include polyethylene, polyethylene copolymers, polyester copolymers and mixtures thereof. The use of low density polyethylene is particularly preferred and is applied to the barrier layer in solution form, extrusion coating or adhesive lamination.

When the moisture impermeable layer is not the adhesive material, e.g., the metal is coated onto the barrier layer, the adhesive material is coated onto the flexible film material. Under such an embodiment, a four layer structure containing, respectively, an adhesive layer coated onto a flexible film layer coated onto a barrier layer coated onto a metal layer is produced. Conversely, when the moisture impermeable layer is the adhesive material, the metal layer may be coated onto the flexible film layer. Under such an embodiment, a four layer structure containing, respectively, a metal layer coated onto a flexible film layer coated onto a barrier layer coated onto an adhesive layer is produced.

The exterior layers of the film may be printed using means known in the art to deliver special messages such as birthday greetings, congratulatory remarks, or representations of famous characters, e.g., BARNEY THE DINOSAUR or the MIGHTY MORPHIN POWER RANGERS.

Once the laminate film material is produced, it then may be used to yield a final product, and preferably a lighter than air balloon. Other products which require air and moisture impermeability such as food and beverage packaging materials, medical solution packaging, e.g., IV bags, and the like may also incorporate these film materials.

To produce a lighter than air balloon, the laminar film materials are cut to appropriate shapes and then aligned so that the adhesive layers are in contact with one another. In practice, because of the flexibility of the layers, the shape may be any that is desired such as round, square, triangular, curved, and the like. The shape may be that of famous novelty characters such as dinosaurs, the insignia of athletic teams and the like.

Thereafter the adhesives are adhered to each other, leaving an opening so that the material may be later inflated. Adhering the adhesives can be accomplished using means known in the art such as hot platens. If desired, a valve can be inserted into the opening and the adhesive layers abutting the valve adhered to form a complete structure. The use of a valve is considered optional.

For use as a balloon the adhered laminar material is inflated by inserting a lighter than air gas into the opening, or valve if present, and then sealing the opening after the material has been fully inflated. In practice, the materials of the present invention are capable of retaining the lighter than air gas, preferably helium, for at least seven days with retention times of at least one month or one year being possible. As a result, the resulting materials are considered excellent candidates for premium quality balloons.

The invention is described in greater detail by the following non-limiting examples.

EXAMPLE 1

A 10% polyvinyl alcohol solution applied to a cast 5 mil polyethylene terephthalate film (1) and the film is heated to between about 375°–400° F. and dried and stretched in the machine and transverse directions (biaxially oriented). The film is then cooled to allow the polyvinyl alcohol to form a solid layer on the polyethylene terephthalate film. The thickness of the polyvinyl alcohol layer is about 350 angstroms. The oxygen transmission rate of resultant film (1) is $\leq 2$ cc/m$^2$—24 hrs. at 23° C., 50% RH. Aluminum metal is applied to the coated surface of film (1) via high vacuum vapor-phase metallization process. The optical density of the metallized film is 2.2. 1.3 mil of low density polyethylene (LDPE) is applied to the unmetallized surface of the polyethylene terephthalate. Film shapes are die cut and two shapes are heat-sealed together, LDPE side to LDPE side, at the edges to form a pouch with a valve-type opening. The pouch is filled with helium and the opening is sealed. Completed, helium-filled pouch floated in excess of 7 days.

EXAMPLE 2

The process of Example 1 is repeated except that for use as a barrier material, a polyvinylidene chloride emulsion is applied to the biaxially-oriented 0.48 mil polyethylene terephthalate film (2). Oxygen transmission rate of resultant film (2) is about 10 cc/m$^2$— 24 hrs. at 23 C, 50% RH. The resulting pouches did not float for 7 days, and therefore, this film is not considered fit for use as a balloon.

The existing polyvinylidene chloride emulsion coating technology cannot achieve the low oxygen transmission rate levels necessary for this application with coating thicknesses that are (1) flexible enough to avoid fracture and resultant loss of barrier, and (2) thin enough to provide suitable volume to weight ratios to achieve flotation.

COMPARATIVE EXAMPLE 3

The present preferred commercial means for producing high quality novelty balloons is to use metallized nylon films. An uncoated, biaxially oriented 0.48 mil nylon film (3) (oxygen transmission rate is $\leq 2$ cc/m$^2$) is metallized, LDPE coated and formed into pouches as in Example 1. The pouches float in excess of 7 days. However, the nylon film is more expensive to manufacture than that of the embodiment of Example 1. Accordingly, the structure of this invention has a commercial advantage over the current technology being practiced. In addition, the nylon film of Comparative Example 3 weighs $2.0 \times 10^{-5}$ lb/in$^2$ vs. $1.6 \times 10^{-5}$ lb/in$^2$ for the polyester film of Example 1. Thus a balloon made of the film in Example 1 can be 20% smaller than a balloon made of the film in Comparative Example 3 and still float. This demonstrates a technical advantage of the inventive materials as compared to currently successful products.

Having described the invention in detail and by reference to the preferred embodiments thereof, it will be apparent that modifications and variations are possible without departing from the scope of the appended claims.

What is claimed is:

1. A balloon constructed from a flexible film material selected from the group consisting of polyethylene terephthalate, polyethylene, polypropylene, polystyrene, polyamide, polyvinyl chloride, cellophane, cellulose acetate, polyurethane, ethylene vinyl acetate copolymer and metal films which has coated on one or more of its interior or exterior surfaces thereon a barrier material consisting essentially of polyvinyl alcohol, guar gum and mixtures thereof, said barrier material having an oxygen transmission rate of less than 0.5 cm$^3$/100 in$^2$.24 hr. at 75° F., 65% relative humidity, and which has coated on said barrier material on the surface not in contact with the flexible film material a moisture impermeable material selected from the group consisting of aluminum, gold, silver, iron, chromium, nickel and mixtures thereof, said balloon being able to float when inflated with a lighter than air gas.

2. The balloon according to claim 1 wherein said flexible film material is polyethylene terephthalate.

3. The balloon according to claim 2 wherein said barrier material consists essentially of polyvinyl alcohol.

4. The balloon according to claim 2 wherein said flexible film material and said barrier material are in discrete layers.

5. The balloon according to claim 1 wherein said barrier material has an oxygen transmission rate of between about 0.04 and about 0.16 cm$^3$/100 in$^2$.24 hr. at 75° F., 65% relative humidity.

6. The balloon according to claim 1 wherein said balloon has an oxygen transmission rate of between about 0.001 and about 0.01 cm$^3$/100 in$^2$.24 hr. at 75° F., 65% relative humidity.

7. The balloon according to claim 1 wherein the thickness of said barrier material is between about 200 and about 500 Angstroms.

8. A balloon constructed from a laminar material, said material comprising:

(a) a first layer comprising a polyethylene terephthalate film material;

(b) a second layer consisting essentially of polyvinyl alcohol having an oxygen transmission rate of less than 0.5 cm$^3$/100 in$^2$/.24 hr. at 75° F., 65% relative humidity;

(c) a third layer comprising a moisture impermeable metal layer which is in contact with the surface of said second layer which is not contact with the surface of said first layer; and (d) a fourth layer comprising an adhesive which is in contact with the surface of said first layer which is not contact with the surface of said second layer;

said balloon being able to float when inflated with a lighter than air gas.

9. The balloon according to claim 8 wherein said adhesive of the fourth layer comprises low density polyethylene.

10. The balloon according to claim 9 wherein said metal of the third layer comprises aluminum.

11. The balloon according to claim 8 wherein the thickness of said barrier material is between about 200 and about 500 Angstroms.

12. A balloon constructed from a flexible film material selected from the group consisting of polyethylene terephthalate, polyethylene, polypropylene, polystyrene, polyamide, polyvinyl chloride, cellophane, cellulose acetate, polyurethane, ethylene vinyl acetate copolymer and metal films which has coated on one or more of its interior or exterior surfaces thereon a barrier material consisting essentially of polyvinyl alcohol, guar gum and mixtures thereof, said barrier material having an oxygen transmission rate of less than 0.5 cm$^3$/100 in$^2$.24 hr. at 75° F., 65% relative humidity, and which has coated on said flexible film material on the surface not in contact with the barrier material a moisture impermeable material comprising an adhesive or a metal layer, said balloon being able to float when inflated with a lighter than air gas.

13. The balloon according to claim 12 wherein the surface of said flexible film material which is not in contact with said barrier material is coated with an adhesive.

14. The balloon according to claim 13 wherein said adhesive material is selected from the group consisting of polyethylene, polyethylene copolymers, polyester copolymers and mixtures thereof.

15. The balloon according to claim 14 wherein said adhesive material comprises low density polyethylene.

16. The balloon according to claim 12 wherein said moisture impermeable material comprises a metal selected from the group consisting of aluminum, gold, silver, iron, chromium, nickel and mixtures thereof.

* * * * *